(12) United States Patent
Fujimoto et al.

(10) Patent No.: US 11,651,246 B2
(45) Date of Patent: May 16, 2023

(54) QUESTION INFERENCE DEVICE (71) Applicant: NTT DOCOMO, INC., Chiyoda-ku (JP)

(72) Inventors: Hiroshi Fujimoto, Chiyoda-ku (JP);
Takanori Hashimoto, Chiyoda-ku (JP);
Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 1028 days.

(21) Appl. No.: 16/333,423

(22) PCT Filed: Apr. 26, 2018

(86) PCT No.: PCT/JP2018/017044
§ 371 (c)(1),
(2) Date: Mar. 14, 2019

(87) PCT Pub. No.: WO2018/203510
PCT Pub. Date: Nov. 8, 2018

(65) Prior Publication Data
US 2019/0258946 A1    Aug. 22, 2019

(30) Foreign Application Priority Data

May 2, 2017    (JP) .............................. JP2017-091629

(51) Int. Cl.
*G06N 5/04*        (2023.01)
*G06F 16/903*    (2019.01)
(Continued)

(52) U.S. Cl.
CPC ........... *G06N 5/04* (2013.01); *G06F 16/3329* (2019.01); *G06F 16/3346* (2019.01); *G06F 16/90335* (2019.01)

(58) Field of Classification Search
CPC . G06N 5/04; G06F 16/90335; G06F 16/3329; G06F 16/3346
See application file for complete search history.

(56) References Cited

U.S. PATENT DOCUMENTS 9,552,415 B2 *    1/2017    Nagano ................. G06F 16/353
9,646,247 B2 *    5/2017    Bufe, III ........... G06F 16/90324
(Continued)

FOREIGN PATENT DOCUMENTS

JP        2010-9471 A        1/2010
JP        2010009471 A  *    1/2010

OTHER PUBLICATIONS

Xiaobing Xue, et al.. 2008. Retrieval models for question and answer archives. In Proceedings of the 31st annual international ACM SIGIR conference on Research and development in information retrieval (SIGIR '08). Assoc. for Computing Machinery, 475-82. https://doi.org/10.1145/1390334.1390416 (Year: 2008).*

(Continued)

*Primary Examiner* — James T Tsai
(74) *Attorney, Agent, or Firm* — Oblon, McClelland, Maier & Neustadt, L.L.P.

(57) ABSTRACT

A question inference device comprises: an input unit inputting an inquiry from a user; a storage unit storing a plurality of questions prepared in advance and one or more keywords for identifying each question in association with each other; a choice unit referring to the storage unit and choosing a question associated with a keyword contained in the inquiry inputted by the input unit from among the plurality of questions; a computation unit computing the likelihood of each of the plurality of questions for the inquiry inputted by the input unit; an inference unit inferring, based on a choice result of the choice unit and a computation result of the computation unit, such a question that the user intends the substance of the question from among the plurality of (Continued)

questions; and an output unit outputting information based on an inference result of the inference unit.

9 Claims, 8 Drawing Sheets

(51) Int. Cl.
  *G06F 16/33* (2019.01)
  *G06F 16/332* (2019.01)

(56) References Cited

U.S. PATENT DOCUMENTS

| | | | | |
|---|---|---|---|---|
| 2009/0012926 | A1* | 1/2009 | Ishikawa | G06F 16/3325 |
| | | | | 706/47 |
| 2013/0304730 | A1* | 11/2013 | Zhou | G06Q 30/02 |
| | | | | 707/723 |
| 2017/0178626 | A1* | 6/2017 | Gruber | G06F 16/3344 |
| 2017/0293680 | A1* | 10/2017 | Boguraev | G06F 16/3329 |
| 2017/0371861 | A1* | 12/2017 | Barborak | G06F 16/22 |

OTHER PUBLICATIONS

International Search Report dated Jun. 12, 2018 in PCT/JP2018/017044 filed on Apr. 26, 2018.
English translation of the International Preliminary Report on Patentability and Written Opinion of the International Searching Authority dated Nov. 14, 2019 in PCT/JP2018/017044, 9 pages.

\* cited by examiner

| QUESTION | KEYWORD | | | | |
|---|---|---|---|---|---|
| CANNOT CONNECT BY TETHERING | TETHERING | CANNOT CONNECT | — | — | ... |
| PASSWORD OF TETHERING | TETHERING | PASSWORD | — | — | ... |
| TETHERING UTILIZATION DURING CONNECTION WITH WIRELESS LAN | WIRELESS LAN | DURING CONNECTION | TETHERING | UTILIZATION | ... |
| PASSWORD OF MAIL | MAIL | PASSWORD | — | — | ... |
| ... | ... | ... | ... | ... | ... |

(b) 30b

| QUESTION \ KEYWORD | CANNOT CONNECT BY TETHERING | PASSWORD OF TETHERING | TETHERING UTILIZATION DURING CONNECTION WITH WIRELESS LAN | PASSWORD OF MAIL | ... |
|---|---|---|---|---|---|
| TETHERING | 0.2 | 0.2 | 0.1 | 0 | ... |
| CANNOT CONNECT | 0.3 | 0.2 | 0.1 | 0 | ... |
| WIRELESS LAN | 0.1 | 0.2 | 0.9 | 0.01 | ... |
| wi-fi | 0.1 | 0.2 | 0.8 | 0.01 | ... |
| DATA COMMUNICATION | 0.1 | 0 | 0.2 | 0.2 | ... |
| TRANSMISSION | 0 | 0 | 0 | 0.2 | ... |
| ... | ... | ... | ... | ... | ... |

| QUESTION | ANSWER |
|---|---|
| CANNOT CONNECT BY TETHERING | SEE ANSWER PAGE 1. |
| PASSWORD OF TETHERING | SEE ANSWER PAGE 2. |
| TETHERING UTILIZATION DURING CONNECTION WITH WIRELESS LAN | SEE ANSWER PAGE 3. |
| PASSWORD OF MAIL | SEE ANSWER PAGE 4. |
| . . . | . . . |

| QUESTION | LACK KEYWORD | | |
|---|---|---|---|
| CANNOT CONNECT BY TETHERING | CANNOT CONNECT | — | — |
| PASSWORD OF TETHERING | PASSWORD | — | — |
| TETHERING UTILIZATION DURING CONNECTION WITH WIRELESS LAN | WIRELESS LAN | DURING CONNECTION | UTILIZATION |
| PASSWORD OF MAIL | MAIL | PASSWORD | — |
| ... | ... | ... | ... |

QUESTION INFERENCE DEVICE

TECHNICAL FIELD

The present invention relates to a question inference device.

BACKGROUND ART

In such a system as that of FAQ (Frequently Asked Questions), among frequent cases prepared in advance, such a case that the substance of the case is true for a user who is inquiring is inferred (see, Patent Literature 1). For example, from an inquiry inputted by the user, such a question that the user intends the substance of the question is inferred, and an answer corresponding to the question is presented to the user. As one of approaches to inferring a question, there is the classifier type question looking-up. In this approach, as to each of a plurality of questions prepared in advance, the likelihood for one or more keywords contained in an inquiry is computed, and such a question sentence that the total value of the likelihoods of the question sentence is the largest is inferred as such a question that the user intends the substance of the question.

CITATION LIST

Patent Literature

Patent Literature 1: Japanese Unexamined Patent Publication No. 2010-9471

SUMMARY OF INVENTION

Technical Problem

If a less relevant keyword is contained in an inquiry because the inquiry a user inputs is ambiguous etc., the likelihood of a question that is different from such a question that the user intends the substance of the question becomes large. Consequently, the question concerned may be wrongly inferred as such a question that the user intends the substance of the question.

The present invention has been made in view of the above problem, and aims at providing a question inference device which can infer accurately such a question that the user intends the substance of the question.

Solution to Problem

A question inference device in accordance with an aspect of the present invention comprises: an input unit inputting an inquiry from a user, a storage unit storing a plurality of questions prepared in advance and one or more keywords for identifying each question in association with each other; a choice unit referring to the storage unit and choosing a question associated with a keyword contained in the inquiry inputted by the input unit from among the plurality of questions; a computation unit computing the likelihood of each of the plurality of questions for the inquiry inputted by the input unit; an inference unit inferring, based on a choice result of the choice unit and a computation result of the computation unit, such a question that the user intends the substance of the question from among the plurality of questions; and an output unit outputting information based on an inference result of the inference unit.

In the above question inference device, the question associated with the keyword contained in the inquiry from the user is chosen from among the plurality of questions prepared in advance. Also, the likelihood of each of the plurality of questions for the inquiry from the user is computed. Then, based on both results of those choice result and computation result, such a question that the user intends the substance of the question is inferred from among the plurality of questions. Therefore, for example, compared with the case of inferring such a question that the user intends the substance of the question based only on the computation result of the likelihood, it is possible to improve the inference accuracy of question.

Advantageous Effects of Invention

According to an aspect of the present invention, there is provided a question inference device which can infer accurately such a question that the user intends the substance of the question.

DESCRIPTION OF EMBODIMENTS

Hereinafter, embodiments of the present invention are described with reference to the drawings. Note that in the description of the drawings, like elements are given like characters, and repeated descriptions are omitted.

Figure 1:
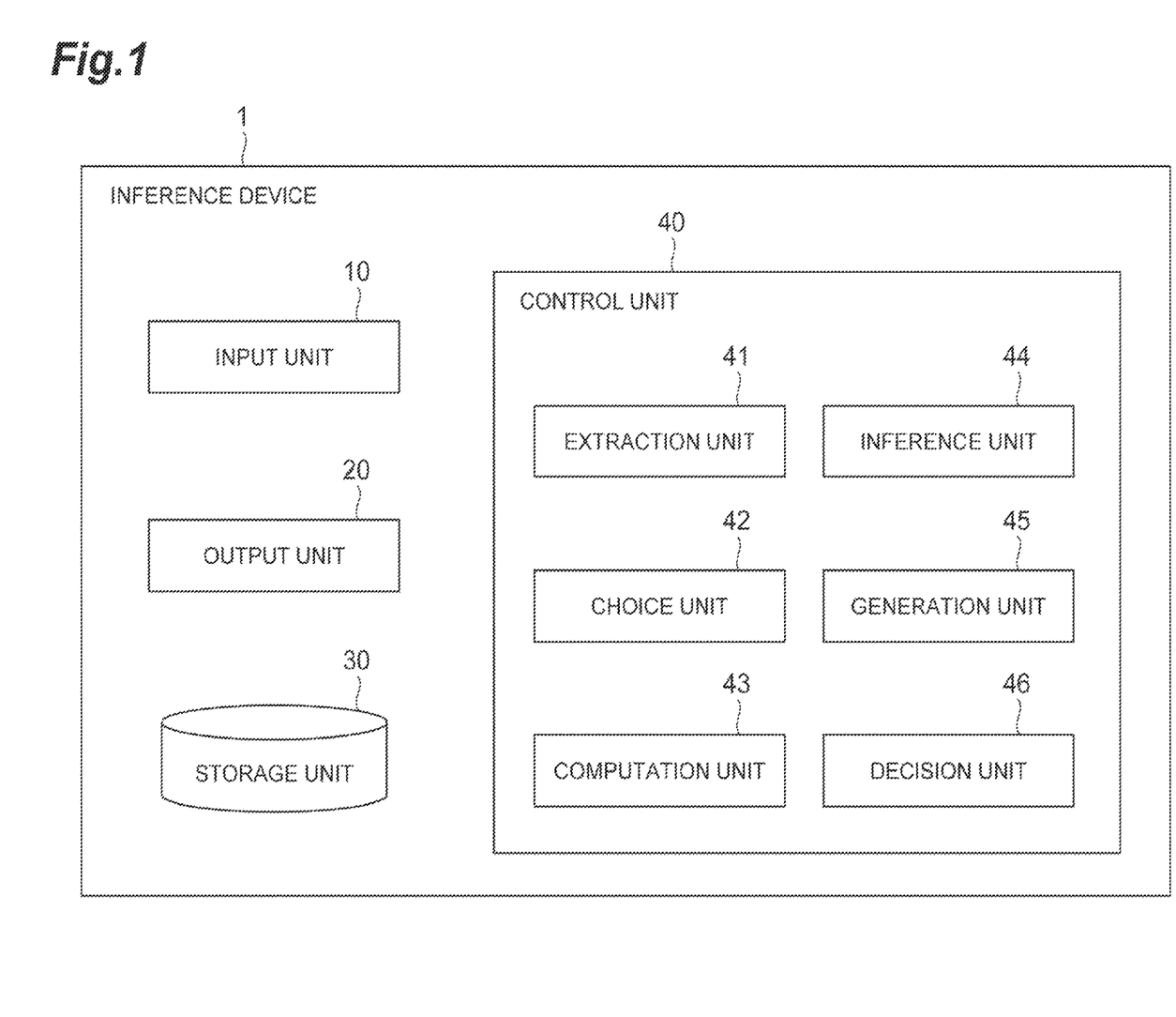
FIG. 1 shows a schematic configuration of a question inference device in accordance with an embodiment.

FIG. 1 shows a schematic configuration of a question inference device in accordance with an embodiment. A question inference device 1 is used to provide a service concerning an FAQ system for example. In that case, in the question inference device 1, a plurality of questions and answers for each question are prepared in advance. The question inference device 1 first accepts an inquiry from a user. Next, the question inference device 1 infers (identifies), from among the questions prepared in advance, such a question that the user who is inquiring intends the substance of the question. Then, the question inference device 1 presents an answer for the inferred question to the user. The question inference device 1 may be realized by using a server for example, and in that case, the question inference device 1 may be utilized through a user terminal (not shown) that can communicate with the server via a network, such as a personal computer and a smartphone.

In the example shown in FIG. 1, the question inference device 1 includes, as its function blocks, an input unit 10, an output unit 20, a storage unit 30, and a control unit 40.

The input unit 10 is a part (input means) inputting the inquiry from the user. The inquiry may be various forms of data such as a word, a sentence, and a document. For example, in the user terminal, the inquiry using key operation, voice operation, etc. is made, and this inquiry is transmitted from the user terminal to the question inference device 1. The input unit 10 of the question inference device 1 receives the inquiry transmitted from the user terminal.

The output unit 20 is a part (output means) outputting a variety of pieces of information. Examples of the information include the answer for the inquiry from the user. The answer may be various forms of data such as a word, a sentence, and a document. For example, the answer is transmitted from the output unit 20 to the user terminal. The user terminal receives the answer transmitted from the output unit 20 of the question inference device 1. In the user terminal, presentation of the answer using character output by a display device, voice output by a speaker, etc. is made.

The storage unit 30 is a part (storage means) storing a variety of pieces of information used in the inference process by the question inference device 1. Examples of the information stored in the storage unit 30 are described with reference to FIGS. 2 to 4. Hereinafter, examples of the information managed in a table format are described, although it is not essential for those pieces of information to be stored in a table format.

Figure 2:
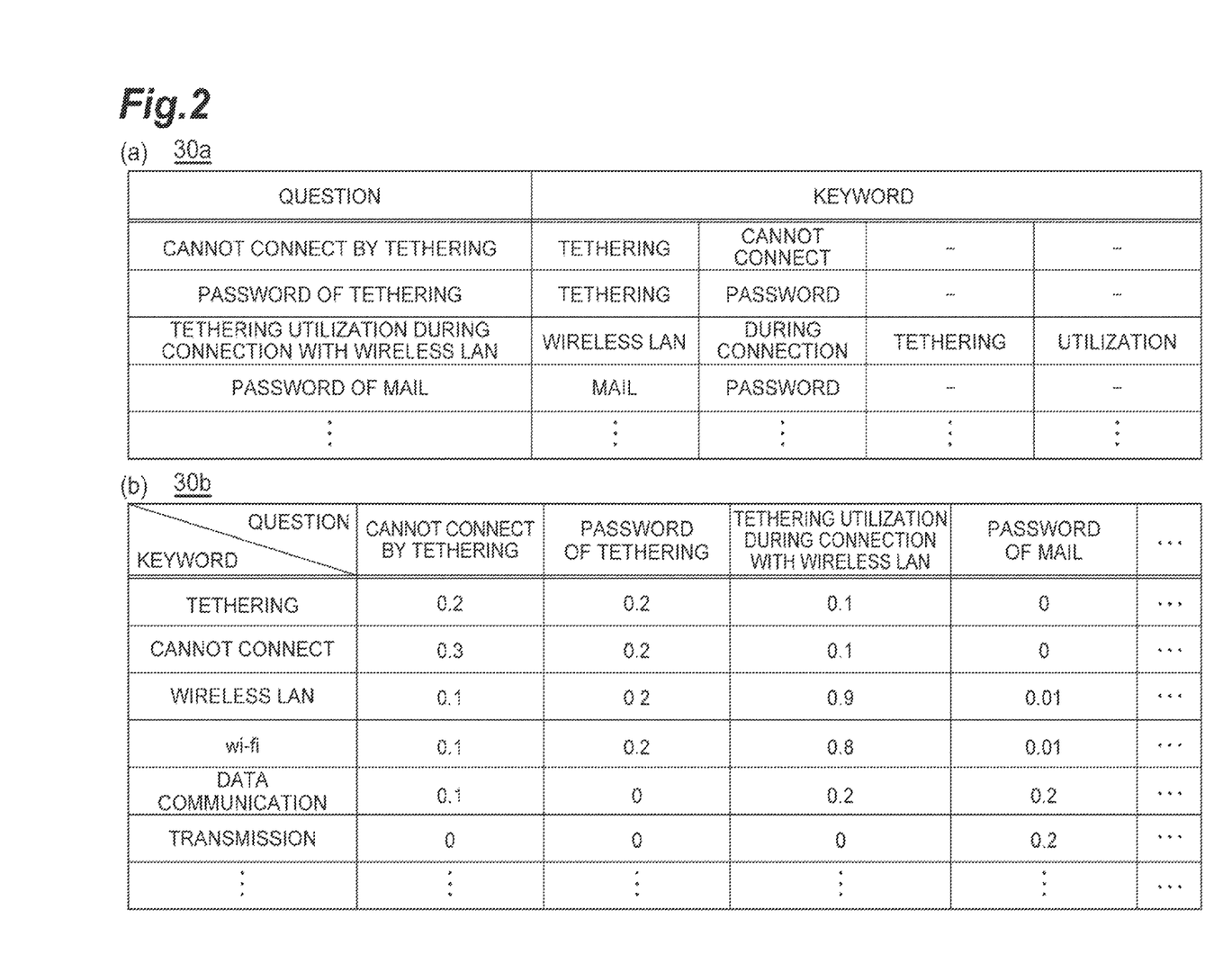
FIG. 2 shows an example of information stored in a storage unit.

In FIG. 2, as the information stored in the storage unit 30, a table 30*a* and a table 30*b* are illustrated.

The table 30*a* is the first management table describing the plurality of questions prepared in advance and one or more keywords for identifying each question in association with each other. The kind and combination of the keywords for each question are the kind and combination specific to each of the questions, and it is possible to identify a corresponding question uniquely from among the plurality of questions. For example, with the question "cannot connect by tethering," the keyword "tethering" and the keyword "cannot connect" are associated. Other questions and keywords are also such as shown in the table 30*a*.

The table 30*b* is the second management table describing the plurality of questions and likelihoods of the keywords for each question in association with each other. The likelihoods of the keywords may be set at different values for each question. It is possible to consider that the larger the likelihood is, the more likely the question is to be such a question that the user intends the substance of the question. For example, the likelihood of the keyword "tethering" is set at 0.2 for the question "cannot connect by tethering," set at 0.2 for the question "password of tethering," set at 0.1 for "tethering utilization during connection with wireless LAN," and set at 0 for "password of mail." Other keywords and questions are also such as shown in the table 30*b*. Note that the keyword "data communication" and the keyword "transmission" shown in the table 30*b* can be contained also in the table 30*a* as the keywords for identifying other questions (not shown). However, the keywords shown in the table 30*a* and the keywords shown in the table 30*b* may be different.

Figure 3:
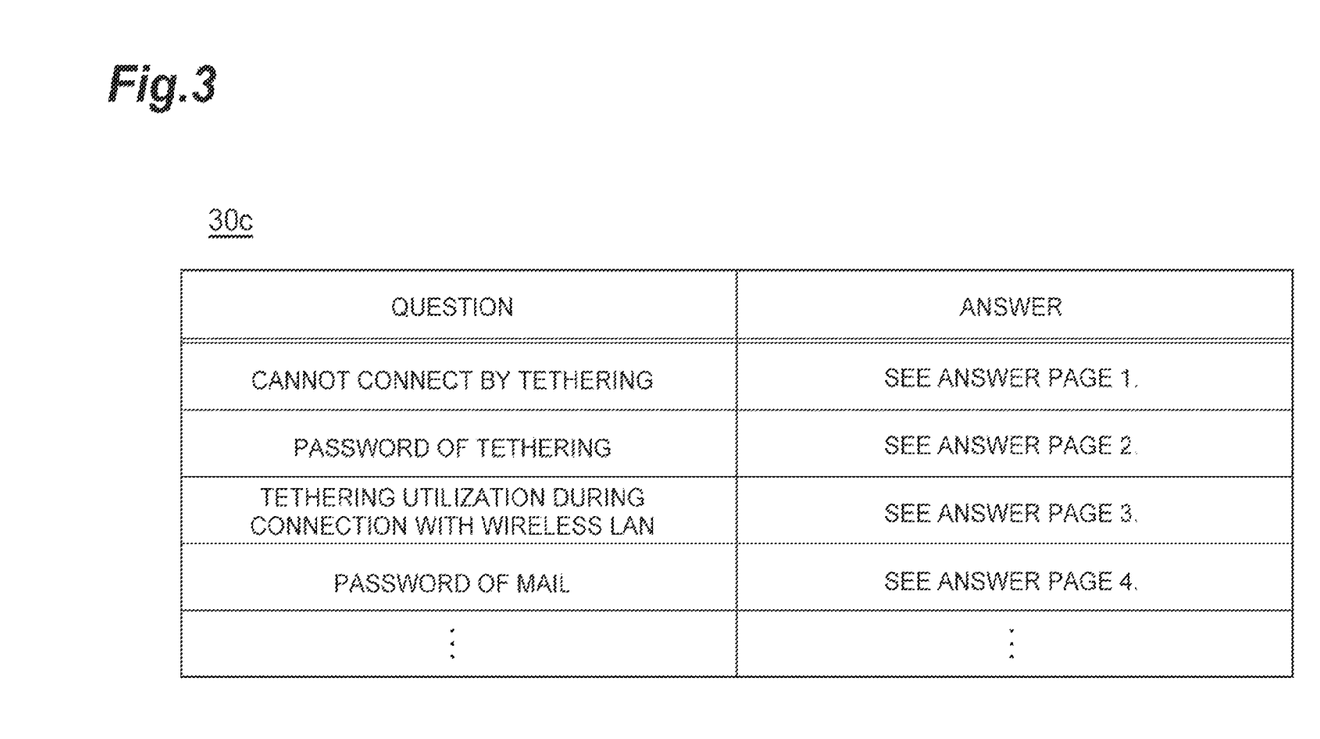
FIG. 3 shows an example of information stored in the storage unit.

In FIG. 3, as the information stored in the storage unit 30, a table 30*c* is illustrated.

The table 30*c* describes the plurality of questions and the answers for each question in association with each other. For example, with the question "cannot connect by tethering," the answer "See answer page 1." is associated. The "answer page 1" is a page on the WEB for example, and viewing the page thereof, the user can obtain the answer for the above question. Other questions and answers are also such as shown in the table 30*c*.

Figure 4:
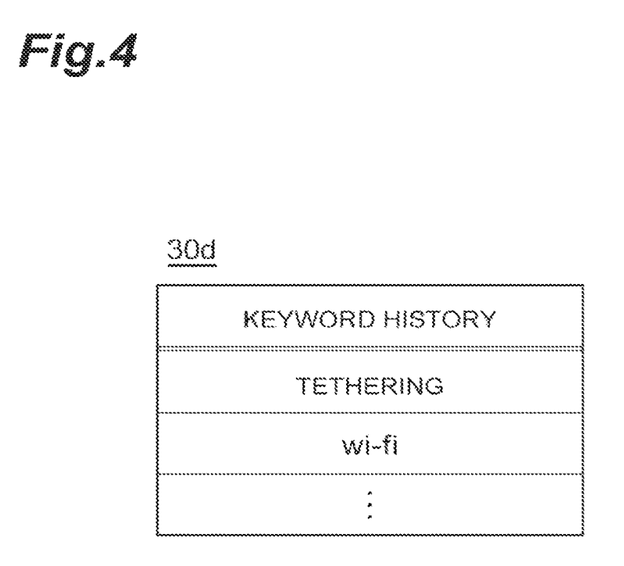
FIG. 4 shows an example of information stored in the storage unit.

In FIG. 4, as a management table the storage unit 30 stores, a table 30*d* is illustrated.

The table 30*d* describes a keyword history. The keyword history is the history of the keywords contained in the inquiries inputted by the input unit 10 (i.e., the keywords extracted by an extraction unit 41) so far. Other than the keywords contained in the inquiries inputted by the input unit 10, keywords concerning asking-back information outputted by the output unit 20 as mentioned below are also stored as the keyword history. In this example, the keyword "tethering" and the keyword "wi-fi" are contained in the keyword history. Note that the keyword history may be managed for each series of processes since the user inquires until the desired answer is obtained, or may be reset each time the series of processes finishes.

Back to FIG. 1 again, the control unit 40 is a part (control means) controlling the process executed in the question inference device 1. In the example shown in FIG. 1, the control unit 40 includes, as its function blocks, the extraction unit 41, a choice unit 42, a computation unit 43, an inference unit 44, a generation unit 45, and a decision unit 46.

The extraction unit 41 is a part (extraction means) extracting a keyword contained in the inquiry from the user inputted by the input unit 10. For example, the extraction unit 41 refers to the table 30*a* and/or the table 30*b* (FIG. 2) in the storage unit 30 and extracts the same keyword as the keyword described there from the inquiry. The approach of the extraction is not limited in particular, although for example, such an approach as to make the morphological analysis to the inquiry data (a word, a sentence, a document, etc.) from the user and check each morpheme with the keywords described in the table 30*a* and/or the table 30*b* may be used.

The choice unit 42 is a part (choice means) referring to the table 30*a* (FIG. 2) and choosing a question associated with the keyword contained in the inquiry inputted by the input unit 10 from among the plurality of questions. Specifically, the choice unit 42 chooses, among the questions shown in the table 30*a*, such a question that at least one corresponding keyword of the question was extracted by the extraction unit 41. An example of the choice by the choice unit 42 is described with reference to FIG. 5 later.

The computation unit 43 is a part (computation means) computing the likelihood of each of the plurality of questions for the inquiry inputted by the input unit 10. The computation approach of the likelihood by the computation unit 43 is not limited in particular, although here, an approach using the table 30*b* is described. The computation unit 43 refers to the table 30*b* and computes the likelihood of each of the plurality of questions by using the keyword contained in the inquiry inputted by the input unit 10. For example, the computation unit 43 computes, as to each question shown in the table 30*b*, the total value of the likelihoods set for keywords extracted by the extraction unit 41 among the keywords shown in the table 30*b* as the likelihood of each question. An example of the computation by the computation unit 43 is described with reference to FIG. 5 later.

The inference unit 44 is a part (inference means) inferring, based on a choice result of the choice unit 42 and a computation result of the computation unit 43, such a question that the user intends the substance of the question from among the plurality of questions. For example, the inference unit 44 inferring, among the questions chosen by the choice unit 42, such a question that the likelihood of the question computed by the computation unit 43 is the largest as such a question that the user intends the substance of the question. The inference unit 44 may infer, among the questions chosen by the choice unit 42, two or more questions as such questions that the user intends the substance of the questions. In this case, such two or more questions that the likelihoods of the questions computed by the computation unit 43 are large may be chosen, and the output unit 20 may output each question in a ranking format in descending order of the likelihood of the question for example. In the user terminal, to the user, two or more questions are presented in a ranking format. The user can select such a question that they themselves intend the substance of the question from among those questions and obtain the answer corresponding to the question concerned.

An example of the inference by the inference unit 44 is described with reference to FIG. 5 together with the example of the choice by the choice unit 42 and the example of the computation by the computation unit 43.

Figure 5:
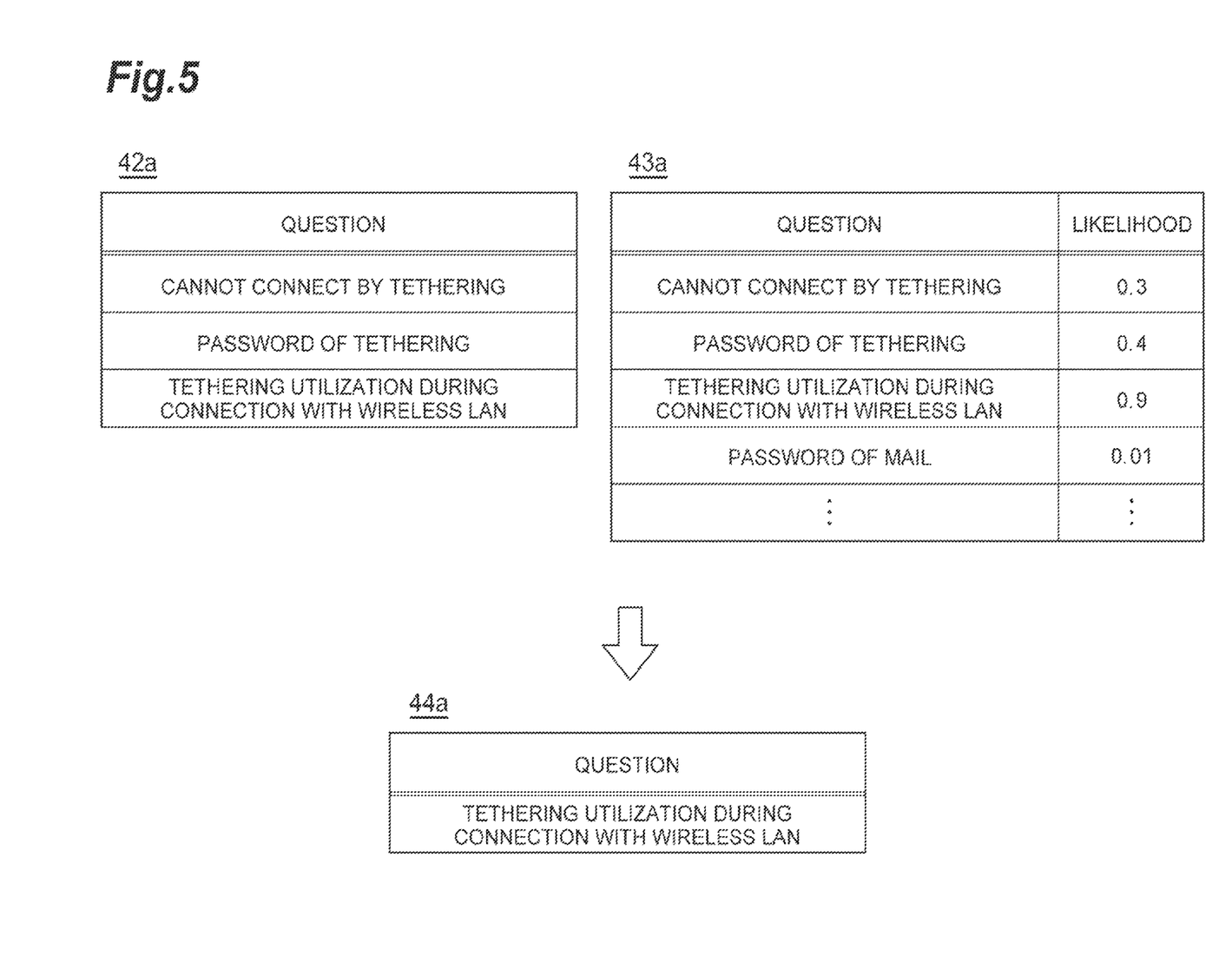
FIG. 5 is a view for describing an operation example of a computation unit, a choice unit, and an inference unit.

A table 42a shown in FIG. 5 shows an example of the choice result of the choice unit 42. Note that it is not essential for the choice result to be created in a table format like the table 42a. For example, when the keyword "tethering" and the keyword "wi-fi" are extracted by the extraction unit 41, the choice unit 42 chooses, among four questions shown in the table 30a (FIG. 2), only three questions "cannot connect by tethering," "password of tethering," and "tethering utilization during connection with wireless LAN." Therefore, those three questions are chosen as shown in the table 42a. As neither the keyword "tethering" nor the keyword "wi-fi" is associated with the question "password of mail," the question "password of mail" is not chosen.

A table 43a shown in FIG. 5 shows an example of the computation result of the computation unit 43. Note that it is not essential for the computation result to be created in a table format like the table 43a. For example, when the keywords "tethering" and "wi-fi" are extracted by the extraction unit 41, the computation unit 43 computes the total value of likelihoods set for the keywords "tethering" and "wi-fi" among the likelihoods shown in the table 30b (FIG. 2) as the likelihood of each question. Specifically, as to the question "cannot connect by tethering," the total value of 0.3 of the likelihood of 0.2 of the keyword "tethering" and the likelihood of 0.1 of the keyword "wi-fi" is computed as the likelihood of the question concerned. Likelihoods of other questions are also such as shown in the table 43a.

A table 44a shown in FIG. 5 shows an example of the inference result of the inference unit 44. Note that it is not essential for the inference result to be created in a table format like the table 44a. The inference unit 44 infers such a question that the user intends the substance of the question by using the choice result of the choice unit 42 shown in the table 42a and the computation result of the computation unit 43 shown in the table 43a. In this example, in the inference unit 44, among the three questions shown in the table 42a, such a question that the likelihood of the question shown in the table 43a is the largest, i.e., the question "tethering utilization during connection with wireless LAN" is inferred as such a question that the user intends the substance of the question. As described previously, two or more questions may be inferred in a ranking format.

Back to FIG. 1 again, the generation unit 45 is a part (generation means) generating the information the output unit 20 outputs.

For example, the generation unit 45 generates the answer (answer information) corresponding to a question inferred by the inference unit 44 among the questions shown in the table 30c (FIG. 3) of the storage unit 30. In the example previously described with reference to FIG. 5, as the question inferred by the inference unit 44 is "tethering utilization during connection with wireless LAN," the generation unit 45 generates the answer corresponding to the question concerned, "See answer page 3.," as the answer information.

Also, the generation unit 45 generates the information about a keyword not contained in the inquiry inputted by the input unit 10 among the keywords stored in the storage unit 30 as the information of such a form that the user can input the keyword concerned as an additional inquiry into the input unit 10 (asking-back information). The keyword concerned is also the keyword not extracted by the extraction unit 41 among the keywords stored in the storage unit 30, and may be referred to as the "lack keyword." The information about the lack keyword is not limited to the lack keyword itself, and may be a sentence, a document, etc. containing the lack keyword. Describing an example of the asking-back information, in the case where the lack keyword is "password," for example, a sentence such as "A question about "password" ?" may be generated as the asking-back information. The user who saw this asking-back information may input, as the additional inquiry, a reply such as "yes" and "no", for example by selecting with screen operation (such as a tap), or may input the lack keyword "password" itself.

An example of the generation of the asking-back information by the generation unit 45 is described with reference to FIG. 6.

Figure 6:
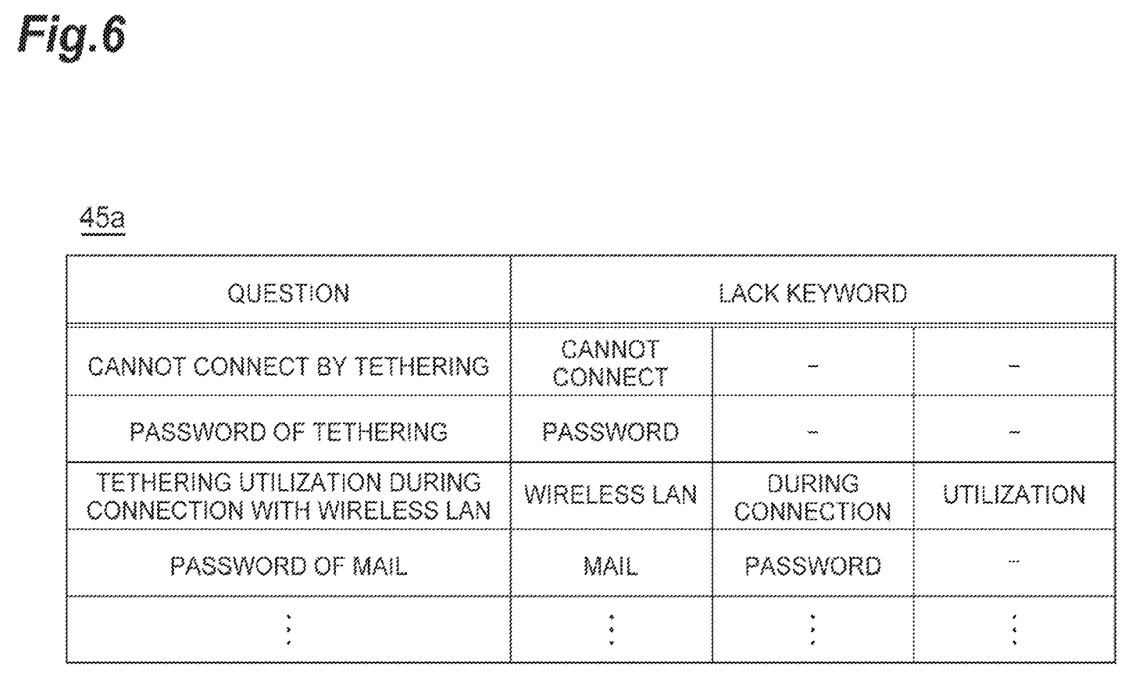
FIG. 6 is a view for describing an operation example of a generation unit.

A table 45a shown in FIG. 6 shows an example of data handled when the generation unit 45 generates the asking-back information. Note that creation of the data in a table format like the table 45a is not essential. The table 45a describes the questions and the lack keywords in association with each other. The lack keyword is a keyword not contained in the inquiry inputted by the input unit 10 among the keywords stored in the storage unit 30 (the keywords contained in the table 30a, the table 30b of FIG. 2). For example, in the case where the keyword "tethering" is contained in the inquiry inputted by the input unit 10, keywords other than "tethering" among the keywords shown in the table 30a are shown in the table 45a as the lack keywords. The generation unit 45 generates the information about these lack keywords as the asking-back information. A plurality of the lack keywords exist in the table 45a, but in this case for example, the generation unit 45 may generate the information about a keyword associated with such a question that the likelihood of the question computed by the computation unit 43 is the largest among the plurality of the lack keywords as the asking-back information. Further, at that time, in the case where a plurality of the lack keywords exist, the information about such a keyword that the likelihood of the keyword is the largest may be generated as the asking-back information. Note that, in the case where such two or more questions that the likelihoods of the questions are the largest exist, for example, the information about the keyword associated with the question with more (or less) lack keywords may be created as the asking-back information.

Once the asking-back information is generated by the generation unit 45, the output unit 20 outputs the asking-back information. The user inputs the keyword concerning the asking-back information outputted by the output unit 20 as the additional inquiry into the input unit 10. The input unit 10 further inputs the additional inquiry from the user. The choice unit 42 chooses a question associated with the keyword contained in the inquiry previously inputted by the input unit 10 and the keyword concerning the additional inquiry newly inputted by the input unit 10. As the approach of the choice is similar to the approach previously described with reference to FIG. 2, the description is not repeated here. The computation unit 43 computes the likelihood of each question by using the keyword contained in the inquiry previously inputted by the input unit 10 and the keyword (the lack keyword) concerning the additional inquiry newly inputted by the input unit 10. As the approach of the computation is similar to the approach previously described with reference to FIG. 2, the description is not repeated here. Note that, as the keyword concerning the additional inquiry is obvious, the extraction process for the additional inquiry by the extraction unit 41 can be eliminated. The keyword concerning the additional inquiry inputted by the input unit 10 is added to the keyword history of the table 30d (FIG. 4). Also, in the case where the additional inquiry was "no" as the previous example, i.e., in the case where the keyword concerning the asking-back information was judged unnecessary for the user, the keyword concerning the additional inquiry may be handled as not existing.

The generation of the asking-back information by the generation unit 45, i.e., the output of the asking-back information by the output unit 20 (and the input of the additional inquiry by the input unit 10) may be executed repeatedly. When the second or subsequent asking-back information is generated, the keywords concerning the asking-back information generated before it are excluded from the lack keywords. Namely, the information about keywords except the keywords contained in the inquiry inputted by the input unit 10 and the keywords concerning the additional inquiry inputted by the input unit 10 among the keywords stored in the storage unit 30 is generated as the asking-back information by the generation unit 45 and outputted by the output unit 20. The output of the asking-back information by the output unit 20 is executed, for example, based on the decision result of the decision unit 46 described next.

The decision unit 46 is a part (decision means) deciding whether or not to execute the output of the asking-back information by the output unit 20. For example, the decision unit 46 decides that, until a predefined condition (which may be referred to as an "end condition" hereinafter) is established, the output of the asking-back information by the output unit 20 should be executed. For example, the end condition may be a condition such as whether or not the number of times of the output of the asking-back information by the output unit 20 is larger than a predetermined number of times. In that case, the decision unit 46 counts the number of times the output of the asking-back information by the output unit 20 is executed. Then, the decision unit 46 decides, in the case where the count number is the predetermined number of times (for example, ten times) or less, that the end condition is not established, and the output of the asking-back information by the output unit 20 should be repeated. On the other hand, the decision unit 46 decides, in the case where the count number is larger than the predetermined number of times, that the end condition is established, and the repetition of the output of the asking-back information by the output unit 20 should be stopped (ended). Also, the end condition may be a condition such as whether or not the number of the questions chosen by the choice unit 42 is a predetermined number or less. In that case, the decision unit 46 counts the number of the questions chosen by the choice unit 42. Then, the decision unit 46 decides, in the case where the count number is less than the predetermined number (for example, five), that the end condition is not established, and the output of the asking-back information by the output unit 20 should be repeated. On the other hand, the decision unit 46 decides, in the case where the count number is the predetermined number or more, that the end condition is established, and the output of the asking-back information by the output unit 20 should be stopped. Besides this, as the end condition, for example, a condition such as whether or not the number of the questions chosen by the choice unit 42 becomes zero may be adopted.

Figure 7:
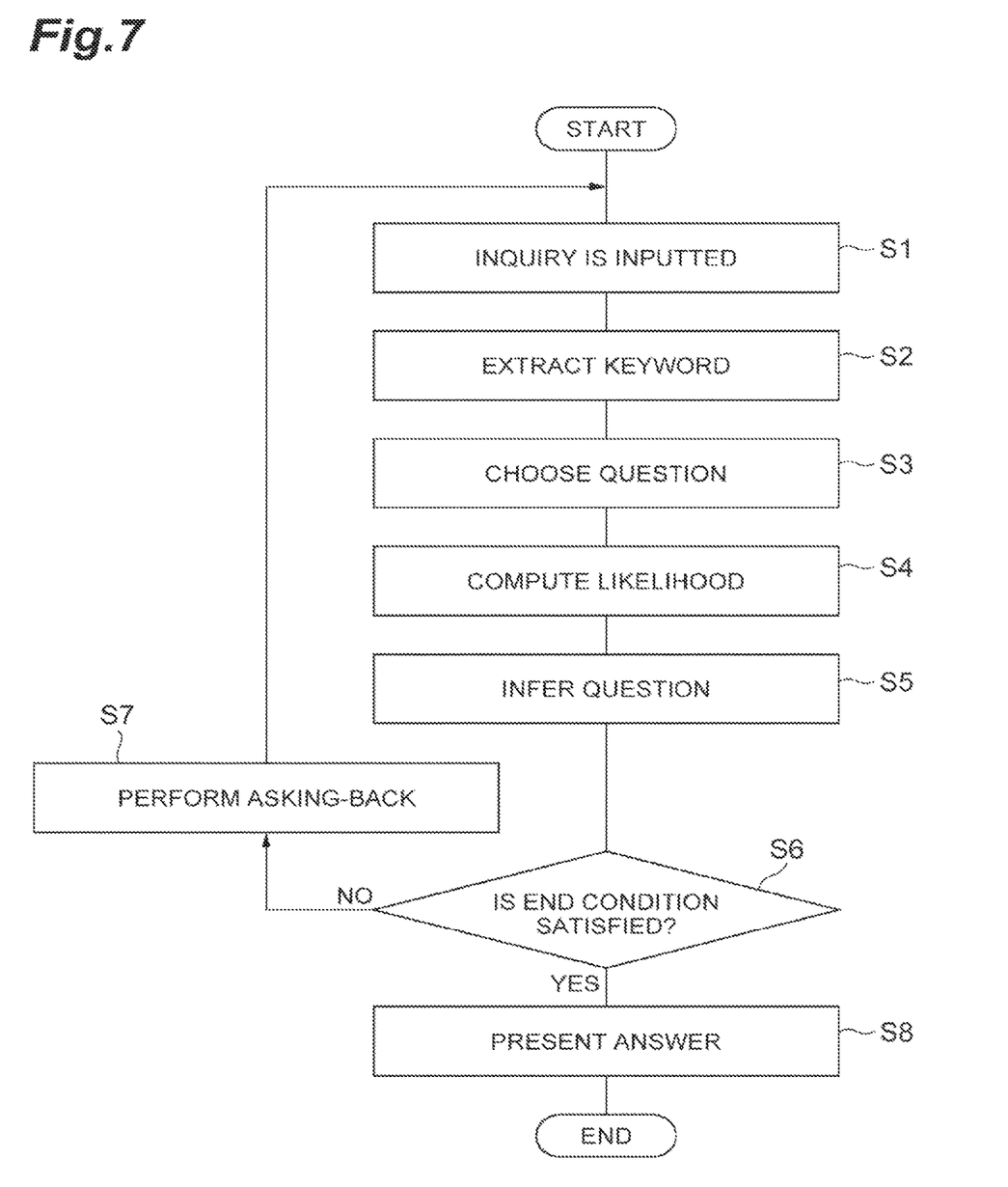
FIG. 7 is a flow chart showing an example of the process executed in the question inference device.

FIG. 7 is a flow chart showing an example of the process (inference process) executed in the question inference device 1.

In step S1, an inquiry is inputted. Specifically, the input unit 10 inputs the inquiry from a user. In the case where the processing is returned to this step S1 via below-mentioned step S7, the input unit 10 inputs an additional inquiry from the user.

In step S2, a keyword is extracted. Specifically, the extraction unit 41 extracts the keyword contained in the inquiry from the user inputted by the input unit 10 in the previous step S1. In the case where the additional inquiry is inputted in step S1, as described previously, the keyword concerning the additional inquiry (lack keyword) may be acquired without the extraction process by the extraction unit 41 being performed. The keyword contained in the inquiry and the keyword concerning the additional inquiry are added to the table 30d of the storage unit 30 as the keyword history.

In step S3, a question is chosen. Specifically, the choice unit 42 refers to the table 30a (FIG. 2) in the storage unit 30 and chooses a question associated with the keyword contained in the inquiry inputted by the input unit 10 in the previous step S1 (and the keyword concerning the additional inquiry) from among a plurality of questions.

In step S4, a likelihood is computed. Specifically, the computation unit 43 refers to the table 30b (FIG. 2) in the storage unit 30 and computes the likelihood of each of the plurality of questions by using the keyword contained in the inquiry inputted by the input unit 10 in the previous step S1 (and the keyword concerning the additional inquiry).

Note that the order of the above step S3 and step S4 may be in reverse.

In step S5, a question is inferred. Specifically, the inference unit 44 infers, based on a choice result of the choice unit 42 in the previous step S3 and a computation result of the computation unit 43 in the previous step S4, such a question that the user intends the substance of the question from among the plurality of questions.

In step S6, it is decided whether or not an end condition is satisfied. This decision is made by the decision unit 46. In the case where the end condition is satisfied (step S6:YES), the processing is advanced to step S8. Otherwise (step S6:NO), the processing is advanced to step S7.

In step S7, asking-back is performed. Specifically, asking-back information is generated by the generation unit 45, and the output unit 20 outputs the asking-back information generated by the generation unit 45. Herewith, the user becomes able to input the keyword concerning the asking-back information outputted by the output unit 20 as the additional inquiry into the input unit 10. After the finish of the process of step S7, the processing is returned to step S1 again.

In step S8, an answer is presented. Specifically, the generation unit 45 generates an answer corresponding to the question inferred by the inference unit 44 in the previous step S5, and the output unit 20 outputs the answer generated by the generation unit 45.

After the finish of the process of step S8, the processing of the flow chart ends.

In the above question inference device 1, a question associated with the keyword contained in the inquiry from the user is chosen from among the plurality of questions prepared in advance (step S3). Also, the likelihood of each of the plurality of questions for the inquiry from the user is computed (step S4). Then, based on both results of those choice result and computation result, such a question that the user intends the substance of the question is inferred from among the plurality of questions (step S5). Therefore, for example, compared with the case of inferring such a question that the user intends the substance of the question based only on the computation result of the likelihood, it is possible to improve the inference accuracy of question.

Specifically, for example, consider the case where the substance a user intends relates to tethering utilization during connection with wireless LAN, but because an inquiry from the user is ambiguous, in that inquiry, keywords that are less relevant to the tethering utilization during connection with wireless LAN, such as "data communication" and "transmission," are contained. In this case, as for the likelihood computed referring to the table 30*b* of FIG. 2, the likelihood is computed as 0.1 as to the question "cannot connect by tethering," the likelihood is computed as 0 as to the question "password of tethering," the likelihood is computed as 0.2 as to the question "tethering utilization during connection with wireless LAN," and the likelihood is computed as 0.4 as to the question "password of mail." As a result, the likelihood of the question "password of mail" is the largest. Hence, if based only on the computation result of the likelihood, the question "password of mail" that is beside the intention of the user would be wrongly inferred as such a question that the user intends the substance of the question. In contrast, in the question inference device 1 in accordance with the embodiment, taking into account the choice result by the choice unit 42, such a question that the user intends the substance of the question is inferred. Specifically, even if the keywords "data communication" and "transmission" were contained in the inquiry from the user, the question "password of mail" would not be chosen by the choice unit 42 because those keywords are not associated with the question "password of mail" as shown in the table 30*a* of FIG. 2. Therefore, it is possible to prevent the question "password of mail" from being wrongly inferred as such a question that the user intends the substance of the question by the inference unit 44. For example, among questions except the question "password of mail," such a question that the likelihood of the question is the largest, "tethering utilization during connection with wireless LAN," is correctly inferred as such a question that the user intends the substance of the question.

Also, in the question inference device 1, the information about a keyword not contained in the inquiry among the keywords stored in the storage unit 30 may be outputted by the output unit 20 in such a form that the user can input the keyword concerned as an additional inquiry into the input unit 10 (step S7), and the additional inquiry from the user may be further inputted by the input unit 10 (step S1). In the above-mentioned example, the asking-back information about keywords (for example, "A question about "tethering" ?" etc.) of the keywords other than the keywords "data communication" and "transmission" (for example, "tethering" etc.) is outputted by the output unit 20. Herewith, it is possible to acquire the keyword not contained in the first inquiry from the user (for example, "tethering" etc.).

Also, in the question inference device 1, a question associated with the keyword contained in the inquiry inputted by the input unit 10 and the keyword concerning the additional inquiry may be chosen from among the plurality of questions (step S3), and the likelihood of each of the plurality of questions may be computed by using the keyword contained in the inquiry inputted by the input unit 10 and the keyword concerning the additional inquiry (step S4). In the above-mentioned example, by using the keyword "tethering" further in addition to the keywords "data communication" and "transmission," the choice of the question and the computation of the likelihood are made. Herewith, it is possible to use not only the keywords contained in the inquiry inputted first (for example, "data communication," "transmission," etc.) but also the keywords inputted as the additional inquiry (for example, "tethering" etc.), so it is possible to further improve the inference accuracy of question. This is because, if the keyword "tethering" is inputted as the additional inquiry, the likelihood computed as to the question "tethering utilization during connection with wireless LAN" further becomes large.

Also, in the question inference device 1, until a predefined condition (end condition) is established, a process outputting in such a form that the user can input the additional inquiry into the input unit 10 may be executed repeatedly (step S6:NO, step S7). For example, until the output of the asking-back information is larger than a predetermined number (for example, ten times), the above output process is executed repeatedly. Herewith, it is possible to make the number of times the additional inquiry is made not too many (not larger than ten times, in this example) while acquiring more keywords.

If such an approach of the key match type question looking-up as to perform asking-back repeatedly until the questions chosen by the choice unit 42 are narrowed down to one is used, there is a possibility that the number of times of asking-back becomes too many. Also, if such an approach of the classifier type question looking-up as to infer such a question that the user intends the substance of the question based only on the likelihood computed by the computation unit 43 is used, as described previously, the inference accuracy of question decreases in the case where the inquiry from the user is ambiguous. Using both the approach of the key match type question looking-up and the approach of the classifier question looking-up type in combination while setting an end condition, it is possible to make the time until an answer is presented to the user not too long while acquiring more keywords to enhance the inference accuracy of question.

Also, in the question inference device 1, the information about a keyword associated with such a question that the likelihood of the question computed by the computation unit 43 is the largest may be outputted in such a form that the user can input the keyword concerned as the additional inquiry into the input unit 10 (step S7). In the above-mentioned example, the information about the keywords "wireless LAN," "during connection," "tethering," "utilization," etc. associated with "tethering utilization during connection with wireless LAN" is outputted. Herewith, it is possible to output the information about the keywords associated with such questions that it is likely the user intends the substance of the questions.

In the above embodiment, as the computation approach of the likelihood by the computation unit 43, the example of computing the total value of the likelihoods set for the keywords shown in the table 30*b* as the likelihood of each question has been described. However, the computation approach of the likelihood by the computation unit 43 is not limited to this.

For example, the likelihoods set for the keywords contained in the inquiry from the user and the keywords concerning the additional inquiry from the user may be weighted, and the total value of those likelihoods may be computed as the likelihood of each question. As a specific example, consider the case where the keyword "mail" is contained in the inquiry, the keyword "wi-fi" is the keyword concerning the subsequent additional inquiry, and the keyword "tethering" is the keyword concerning the further subsequent additional inquiry. In this case, it is possible that the keyword "tethering" concerning the additional inquiry inputted last most reflects the intention of the user, while the keyword "mail" contained in the inquiry inputted first is such that the degree of the reflection of the intention of the user is the smallest. Therefore, the likelihood of each keyword is weighted so that the weight of the likelihood of the keyword "tethering" is larger than the weights of the likelihoods of other keywords "wi-fi" and "mail," and the weight of the likelihood of the keyword "wi-fi" is larger than the weight of the likelihood of the keyword "mail." For example, the likelihood of the keyword "tethering" is weighted by a factor of 1.0 (that is, no correction), the likelihood of the keyword "wi-fi" is weighted by a factor of 0.8 (that is, corrected by a factor of 0.8), and the likelihood of the keyword "mail" is weighted by a factor of 0.6 (that is, corrected by a factor of 0.6). In this way, it is also possible to make the computation of the likelihood taking into account the input order (in time-series) of the keywords shown in the inquiry from the user and the additional inquiry.

Features other than the keyword may be used for the computation of the likelihood. Examples of the features other than the keyword include the information of the part of speech of a word, the length of a document, and bi-gram. For example, depending on the kind of the part of speech of the word concerning an inquiry, the likelihood of the same keyword as the word or the keyword containing the word may be corrected to compute the likelihood of each question. Herewith, the computation of the likelihood taking into account even the information of the part of speech of the word becomes possible. Also, depending on the length of the document concerning an inquiry, the likelihood set for the keyword contained in the document may be corrected to compute the likelihood of each question. Herewith, the computation of the likelihood taking into account even the length of the document becomes possible. Also, in the case where in an inquiry two keywords appear in succession (lie side by side), depending on the combination of the two keywords, the likelihoods of those keywords may be corrected, and the likelihood of each question may be computed. Herewith, the computation of the likelihood taking into account bi-gram becomes possible. Also, approaches capable of computing the likelihood more accurately, such as the likelihood computation taking into account the appearance order of the keywords in the document, may be used. For example, the likelihood of each keyword may be corrected so that the earlier the keyword appears in the document, the larger the weight of the likelihood is.

The likelihood may be computed without using the keywords. For example, the computation unit 43 may compute the distance, the similarity, etc. between the inquiry inputted by the input unit 10 and each question (the distance, the similarity, etc. between an input document and a question document) on the basis of a machine learning based model. The representation approach of the distance, the similarity, etc. between the inquiry and each question is not limited in particular, although for example, the cosine similarity may be used.

Figure 8:
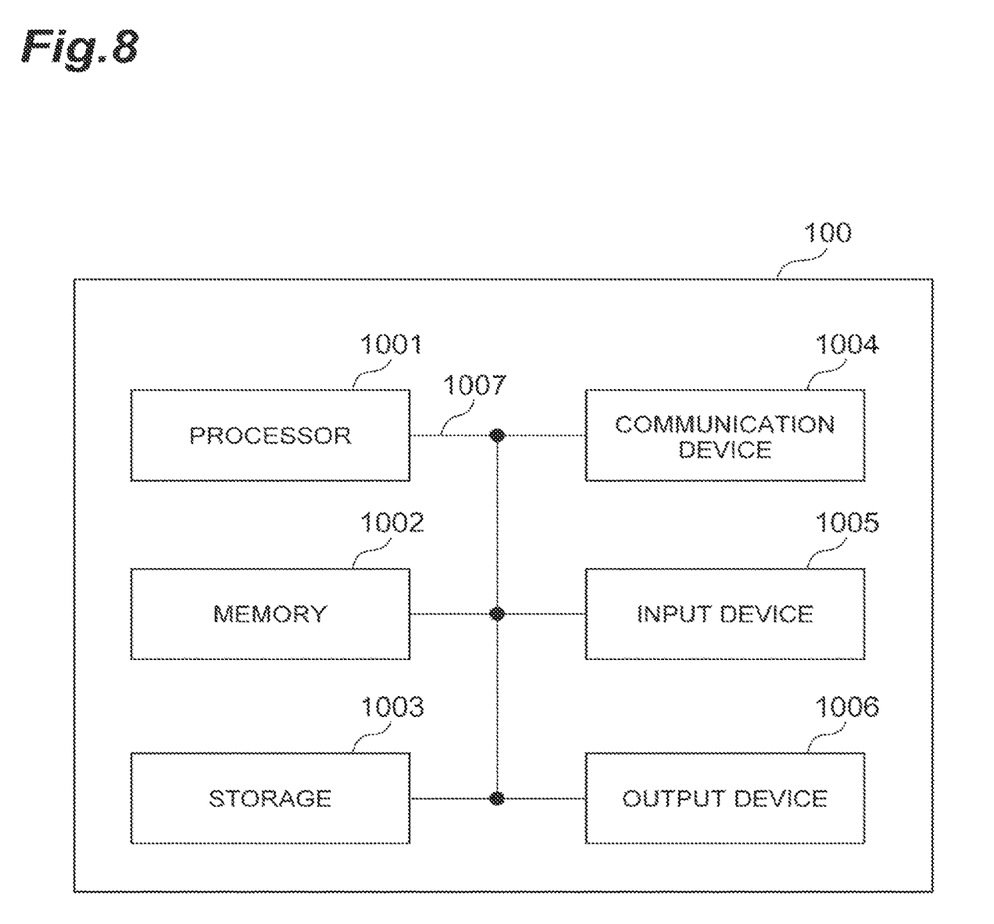
FIG. 8 shows an example of a hardware configuration of the question inference device.

Finally, an example of a hardware configuration of the question inference device 1 is described with reference to FIG. 8. Physically, the above-mentioned question inference device 1 may be configured as a computer device including a processor 1001, a memory 1002, a storage 1003, a communication device 1004, an input device 1005, an output device 1006, a bus 1007, etc.

Note that, in the following description, the language "device" can be read as circuit, unit, etc. The hardware configuration of the question inference device 1 may be configured to include one or more respective devices shown in the figure, or may be configured without including some devices.

Each function in the question inference device 1 is realized with the processor 1001 performing arithmetic operation and controlling the communication by the communication device 1004 and the reading and/or writing of data in the memory 1002 and the storage 1003, by making predetermined software (programs) read on the hardware such as the processor 1001 and the memory 1002.

The processor 1001, for example, operates an operating system to control the entire computer. The processor 1001 may be configured with a Central Processing Unit (CPU) including interfaces with peripheral devices, control devices, arithmetic operation devices, registers, etc. For example, the control unit 40 of the question inference device 1 may be realized with the processor 1001.

Also, the processor 1001 reads programs (program codes), software modules, and data from the storage 1003 and/or the communication device 1004 into the memory 1002, and executes various processes according to these. As for programs, the program is used that causes the computer to execute at least some of the operation described in the above-mentioned embodiment. For example, the control unit 40 of the question inference device 1 may be realized with the control program that is stored in the memory 1002 and operates in the processor 1001, or other function blocks may be realized similarly. Although the above-mentioned various processes have been described to the effect that they are executed with one processor 1001, they may be executed by two or more processors 1001 simultaneously or sequentially. The processor 1001 may be implemented with one or more chips. Note that the program may be transmitted from a network through an electric communication line.

The memory 1002 is a computer readable recording medium, and may be configured with at least one of for example, a ROM (Read Only Memory), an EPROM (Erasable Programmable ROM), an EEPROM (Electrically Erasable Programmable ROM), a RAM (Random Access Memory), etc. The memory 1002 may be called a register, a cache, a main memory (main storage device), etc. The memory 1002 can preserve programs (program codes), software modules, etc. executable for embodying a wireless communication method in accordance with an embodiment of the present invention.

The storage 1003 is a computer readable recording medium, and may be configured with at least one of, for example, an optical disc such as a CD-ROM (Compact Disc ROM), a hard disk drive, a flexible disk, a magneto-optical disk (for example, a compact disc, a digital versatile disc, a Blu-ray® disc), a smart card, a flash memory (for example, a card, a stick, a key drive), a Floppy® disk, a magnetic strip, etc. The storage 1003 may be called an auxiliary storage device. The above-mentioned storage medium may be, for example, a database, a server, or other suitable media including the memory 1002 and/or the storage 1003.

The communication device 1004 is hardware for making communication between computers through a wired and/or wireless network (a transmission and reception device), and is also referred to as, for example, a network device, a network controller, a network card, a communication module etc. For example, the above-mentioned input unit 10, output unit 20, etc. may be realized with the communication device 1004.

The input device 1005 is an input device accepting input from the outside (for example, a keyboard, a mouse, a microphone, a switch, a button, a sensor, etc.). The output device 1006 is an output device embodying output to the outside (for example, a display, a speaker, an LED lamp etc.). Note that the input device 1005 and the output device 1006 may be an integral configuration (for example, a touch panel).

Also, each device such as the processor 1001 and the memory 1002 is connected by the bus 1007 for communicating information. The bus 1007 may be configured with a single bus, or may be configured with buses different between the devices.

Also, the question inference device 1 may be configured to include hardware such as a microprocessor, a Digital Signal Processor (DSP), an ASIC (Application Specific Integrated Circuit), a PLD (Programmable Logic Device), an FPGA (Field Programmable Gate Array), or some or all of function blocks may be realized with the hardware concerned. For example, the processor 1001 may be implemented with at least one of these pieces of hardware.

Hereinbefore, the present embodiment has been described in detail, although it is evident for those skilled in the art that the present embodiment is not limited to the embodiment described herein. The present embodiment can be embodied as modifications and variations without departing from the spirit and the scope of the present invention defined by the recitation of the claims. Therefore, the recitation hereof aims at exemplary description, and does not have any limiting meaning for the present embodiment.

Each aspect/embodiment described herein may be applied to a system utilizing, and/or to a next generation system extended based on, LTE (Long Term Evolution), LTE-A (LTE-Advanced), SUPER 3G, IMT-Advanced, 4G, 5G, FRA (Future Radio Access), W-CDMA®, GSM®, CDMA2000, UMB (Ultra Mobile Broad-band), IEEE 802.11 (Wi-Fi), IEEE 802.16 (WiMAX), IEEE 802.20, UWB (Ultra-Wide Band), Bluetooth®, and other suitable systems.

The processing procedure, the sequence, the flow chart, etc. of each aspect/embodiment described herein may be rearranged as for order as long as there is no contradiction. For example, as to the method described herein, the elements of various steps are presented in exemplary order, and the order is not limited to the presented specific order.

The information etc. having been inputted and outputted may be preserved in a specific location (for example, a memory), or may be managed in a management table. The information etc. inputted and outputted may be overwritten, updated, or additionally written. The information etc. having been outputted may be deleted. The information etc. having been inputted may be transmitted to other devices.

The decision may be made with a value represented by one bit (either zero or one), or may be made with a truth value (Boolean: true or false), or may be made with comparison of numerical values (for example, comparison with a predetermined value).

Each aspect/embodiment described herein may be used alone, or may be used in combination, or may be used being switched along with the execution. Also, notification of predetermined information (for example, notification of "that X") is not limited to that made explicitly, but may be made implicitly (for example, by not making notification of the predetermined information concerned).

The software should be interpreted widely, whether it is called software, firmware, middleware, microcode, hardware description language or it is called other names, so that it means an instruction, an instruction set, a code, a code segment, a program code, a program, a subprogram, a software module, an application, a software application, a software package, a routine, a subroutine, an object, an executable file, an execution thread, a procedure, a function, etc.

Also, the software, instruction, etc. may be transmitted and received through a transmission medium. For example, in the case where the software is transmitted from a web site, a server, or other remote sources using wired technology such as a coaxial cable, an optical fiber cable, a twisted pair, and digital subscriber line (DSL) and/or wireless technology such as infrared, wireless, and a microwave, these wired technology and/or wireless technology are included in the definition of the transmission medium.

The information, signals etc. described herein may be represented using any of various different technologies. For example, the data, instructions, commands, information, signals, bits, symbols, chips, etc. that may be referred to throughout the above description may be represented by voltage, current, electromagnetic waves, magnetic fields or magnetic particles, photo fields or photons, or any combination thereof.

Note that the term described herein and/or the term necessary for an understanding hereof may be replaced with the term having identical or similar meaning.

Also, the information, parameter etc. described herein may be represented as an absolute value, or may be represented as a relative value from a predetermined value, or may be represented as another piece of corresponding information.

The user terminal may be called, by those skilled in the art, a mobile communication terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or a number of other suitable terms.

The terms "judging," "determining" used herein may encompass a wide variety of pieces of operation. The "judging," "determining" may include, for example, regarding having calculated, computed, processed, derived, investigated, looked up (for example, looking-up in a table, a database, or another data structure), ascertained as having "judged," "determined," etc. Also, the "judging," "determining" may include regarding having received (for example, receiving information), transmitted (for example, transmitting information), inputted, outputted, accessed (for example, accessing data in a memory) as having "judged," "determined," etc. Also, the "judging," "determining" may include regarding having resolved, selected, chosen, established, compared, etc. as having "judged," "determined."

That is, the "judging," "determining" may include regarding some operation as having "judged," "determined."

The recitation "based on" used herein does not mean "based only on" unless otherwise specified. In other words, the recitation "based on" means both "based only on" and "based at least on."

In the case of using appellations such as "first," "second" herein, no reference to the elements limits the amount or the order of those elements generally. These appellations may be used herein as a convenient method of distinguishing between two or more elements. Therefore, reference to the first and second elements does not mean that only the two elements can be adopted there, or the first element must precede the second element in some way.

As long as "include," "including," and variants thereof are used herein or in the claims, these terms are intended to be inclusive similar to the term "comprising." Further, the term "or" used herein or in the claims is intended not to be an exclusive disjunction.

Herein, except the case where no device but only one exists obviously in context or technically, a plurality of the devices shall be also included.

Throughout the present disclosure, if a thing is not proved singular obviously in context, a plurality of the things shall be included.

REFERENCE SIGNS LIST

1 . . . question inference device, 10 . . . input unit, 20 . . . output unit, 30 . . . storage unit, 30a-30d . . . table, 40 . . . control unit, 41 . . . extraction unit, 42 . . . choice unit, 43 . . . computation unit, 44 . . . inference unit, 45 . . . generation unit, 46 . . . decision unit

The invention claimed is:

1. A question inference device comprising:
processing circuitry configured to
input an inquiry from a user;
store, in a memory, a plurality of questions prepared in advance and one or more keywords for identifying each question in association with each other;
acquire one or more keywords from the inquiry, referring to the memory and choosing a question, as a choice result, associated with a keyword that matches the acquired keyword from among the plurality of questions;
compute a computation result of a likelihood for each of the plurality of questions for the inputted inquiry;
infer, based on the choice result and the likelihood corresponding to the computation result, such a question that the user intends from among the plurality of questions to generate an inference result; and
output information based on the inference result,
the question inference device further comprising:
a table in which the likelihoods, which are probability values corresponding to the computation results, for each of the plurality of questions associated with each keyword such that the table indicates, for each keyword, a separate likelihood that the respective keyword is associated with each of the plurality of questions; wherein
the processing circuitry computes the computation result by extracting one or more keywords from the inquiry, referring to the table, and computing a likelihood with the one or more keywords for each of the plurality of questions,
wherein the processing circuitry
outputs keyword information not contained in the inquiry among the stored keywords in such a form that the user can input the keyword concerned as an additional inquiry,
further inputs the additional inquiry from the user,
chooses, as a second choice result, a question associated with the keyword contained in the inputted inquiry and the keyword concerning the additional inquiry from among the plurality of questions,
computes a second likelihood for each of the plurality of questions for the inputted inquiry and the additional inquiry by weighting the stored keywords such that a keyword corresponding to any subsequent additional inquiry is set to have a higher weight than a keyword corresponding to an inquiry inputted prior to the subsequent additional inquiry,
infers, based on the choice result and the second likelihoods, such a second question that the user intends from among the plurality of questions to generate a second inference result, and
outputs second information based on the second inference result.

2. The question inference device according to claim 1, wherein
the processing circuitry outputs information about a keyword not contained in the inquiry among the stored keywords in such a form that the user can input the keyword concerned as an additional inquiry, and
the processing circuitry further inputs the additional inquiry from the user.

3. The question inference device according to claim 2, wherein
the processing circuitry executes repeatedly, until a predefined condition is established, a process outputting in such a form that the user can input the additional inquiry.

4. The question inference device according to claim 2, wherein
the processing circuitry outputs information about a keyword associated with such a question that the likelihood of the computed question is the largest in such a form that the user can input the keyword concerned as the additional inquiry.

5. The question inference device according to claim 1, wherein,
the processing circuitry, when a plurality of keywords are extracted from the inquiry,
computes the likelihood of each of the plurality of questions for each keyword, and
computes the likelihood of the question for the query by computing the sum of the likelihoods for each question.

6. The question inference device according to claim 2, wherein,
the processing circuitry outputs information relating to a keyword that is not included in the inquiry, so as to return the inquiry to the user.

7. The question inference device according to claim 6, wherein
the processing circuitry
extracts a keyword not included in the inquiry from among the stored keywords as a lack keyword and generates a table in which the inquiry and the lack keyword are associated with each other, and outputs the lack keyword as an asking-back for the inquiry.

8. The question inference device according to claim 7, wherein
the processing circuitry determines a lack keyword based on the likelihood and outputs the lack keyword.

9. A method, implemented by processing circuitry of a question inference device, comprising:
inputting an inquiry from a user;
storing, in a memory, a plurality of questions prepared in advance and one or more keywords for identifying each question in association with each other;
acquiring one or more keywords from the inquiry, referring to the memory and choosing a question, as a choice result, associated with a keyword that matches the acquired keyword from among the plurality of questions;
computing a computation result of a likelihood for each of the plurality of questions for the inputted inquiry;
inferring, based on the choice result and the likelihood corresponding to the computation result, such a question that the user intends from among the plurality of questions to generate an inference result; and
outputting information based on the inference result,
the question inference device further comprising a table in which the likelihoods, which are probability values corresponding to the computation results, for each of the plurality of questions associated with each keyword such that the table indicates, for each keyword, a separate likelihood that the respective keyword is associated with each of the plurality of questions; wherein
the method includes computing the computation result by extracting one or more keywords from the inquiry, referring to the table, and computing a likelihood with the one or more keywords for each of the plurality of questions,
outputting keyword information not contained in the inquiry among the stored keywords in such a form that the user can input the keyword concerned as an additional inquiry,
further inputting the additional inquiry from the user,
choosing, as a second choice result, a question associated with the keyword contained in the inputted inquiry and the keyword concerning the additional inquiry from among the plurality of questions,
computing a second likelihood for each of the plurality of questions for the inputted inquiry and the additional inquiry by weighting the stored keywords such that a keyword corresponding to any subsequent additional inquiry is set to have a higher weight than a keyword corresponding to an inquiry inputted prior to the subsequent additional inquiry
inferring, based on the choice result and the second likelihoods, such a second question that the user intends from among the plurality of questions to generate a second inference result, and
outputting second information based on the second inference result.

* * * * *